United States Patent
Unde

(12) 
(10) Patent No.: US 6,223,974 B1
(45) Date of Patent: May 1, 2001

(54) TRAILING EDGE STRESS RELIEF PROCESS (TESR) FOR WELDS

(76) Inventor: Madhavji A. Unde, 1980 Watt Ave., Sacramento, CA (US) 95825

(*) Notice: Subject to any disclaimer, the term of this patent is extended or adjusted under 35 U.S.C. 154(b) by 0 days.

(21) Appl. No.: 09/417,470

(22) Filed: Oct. 13, 1999

(51) Int. Cl.⁷ .............................. B23K 1/06; B23K 20/10
(52) U.S. Cl. ..................... 228/199; 228/1.1; 228/110.1
(58) Field of Search .................. 228/110.1, 1.1, 228/199

(56) References Cited

U.S. PATENT DOCUMENTS

| | | | |
|---|---|---|---|
| 3,741,820 | * | 6/1973 | Hebel, Jr. et al. ............ 148/12.9 |
| 4,381,673 | * | 5/1983 | Klauba et al. .................. 73/579 |
| 4,386,727 | * | 6/1983 | Unde ............................. 228/102 |
| 4,968,359 | * | 11/1990 | Hebel, Jr. et al. ............ 148/12.9 |
| 5,024,371 | * | 6/1991 | Unde ............................. 228/116 |
| 5,035,142 | * | 7/1991 | Dryga et al. ................... 73/579 |
| 5,242,512 | * | 9/1993 | Bagley et al. ................ 148/558 |
| 5,305,361 | * | 4/1994 | Enomoto et al. ............. 376/316 |
| 6,127,643 | * | 10/2000 | Unde . |

FOREIGN PATENT DOCUMENTS

407284923 * 10/1995 (JP) .
409234585 * 9/1997 (JP) .
410296461 * 11/1998 (JP) .

* cited by examiner

*Primary Examiner*—Patrick Ryan
*Assistant Examiner*—Kiley Stoner

(57) ABSTRACT

A process, termed Trailing Edge Stress Relief (TESR) is described which can be used to produce a weld joint with reduced residual stress level with least defects. In this process, cyclic stresses are applied to the trailing edge of the weld (TEW) during welding. Welding operation is always in quasi-stationary state; but in the TEW microstructure is in formative stages. Therefore TEW is in the Second order Quasi Stationary (SQS) state. During the time solidification of the cup of molten metal takes place, in TESR process cyclic stress is applied that modifies the structure of microstructure. The modification of the structure of microstructure reduces the grain size and the potential energy that is otherwise retained after solidification in it, as residual stress. In the process described pneumatic vibrators are used; but such cyclic stresses can be generated by other devices using electrical, electronic, magnetic or ultrasonic energy; and systems can be designed using combinations thereof. Further such a system can be an integral part of a welding operation making it a versatile process. Further when sufficient data on parameters is collected, it will be possible to design the residual stress level in a weld.

4 Claims, 4 Drawing Sheets

(a) Section on Center Line in Welding Direction (b) Section Y-Y, at instant t2

TRAILING EDGE STRESS RELIEF PROCESS (TESR) FOR WELDS

BACKGROUND OF THE INVENTION

1. Field of Invention

The present invention is related to producing welds with reduced residual stress level and without commonly known defects. More particularly invention relates to an improvement in the process for prevention of build up of residual stress disclosed in applicant's U.S. Pat. No. 4,386,727, Jun. 7, 1983.

The process described in applicant's patent mentioned above has received acclaim from scientific circles. But improvements are necessary and possible on the basis of further understanding of the welding process itself, the manner in which structures of microstructure are formed and causes how stresses come into effect in a weld.

2. Background

It is obvious that molten metal solidifies to form a weld nugget and it also makes joint/s between the interface of liquid metal and the solid face of the cup formed in base metals. Welding itself is a quasi-stationary state, in which a hill of heat moves over stationary weld plates arranged in juxta position for welding. Such a hill of heat is with set physical dimensions once welding attains a stable condition, as first observed by Rosenthal in 30's, and it moves along the center line of the weld at the welding speed.

As disclosed in my U.S. Pat. No. 4,386,727 the external stress of low value, applied at low frequency at center of weld nugget at one end, in experimental welds, prevents build up of residual stress during solidification. The stress required is of low value, because bond strength at solidification temperatures is low. Process in U.S. Pat. No. 3,741,820 and its improvement, U.S. Pat. No. 4,968,359, attempts application of frequencies close to natural mechanical resonant harmonic or its subharmonic frequencies of the entire weldment after weld solidification. These generate high stresses. A weld usually occupies only a very small fraction of volume of a weldment. Therefore major portion of energy developed is used in larger volume of the weldment; and only marginal benefits may be achieved in reducing residual stress in solidified weld. Further, such stresses do not act on individual crystals, but on solidified (monolithic) mass of crystals which is the weld nugget, along with other part of the weldment. Further the microstructure in the nugget is then at a temperature far lower than the solidification temperature and therefore bond strengths are high. These facts cause only marginal success in attempts to reduce residual stress in welds. Results of such processes are normally compared with the widely used thermal stress relief process which gives better results in reduction of residual stress. Another valid objection is that in such processes the useful fatigue life of the weldment is used up and therefore reduced.

In the process disclosed here, stresses are applied at the solidification temperature, to the Trailing Edge of the Weld (TEW), in particular to solid surface resulting from preceding Solidifying Metal Zone in the Second order Quasi Stationary (SQS) state; further as bond strengths are lower, input of energy at lower stress amplitudes is necessary. Further, stress applied is transmitted to individual growing crystals in the Liquid Metal Zone (LMZ) through semi-liquid state, which has a certain degree of mobility. These conditions should be compared with conditions when only a fraction of the applied stress that may be reaching the solidified mass of the weld when stress frequencies closer to harmonic or sub-harmonic are applied to the entire weldment. Minor positive effects on welds are observed by application of such processes during welding. These can be inferred from results which are embodiment of U.S. Pat. No. 4,386,727.

Modification of the microstructure and therefore reduction of residual stress and elimination of the discontinuities such as porosity, are distinct benefits of the process disclosed herein; therefore, the instant invention is a necessary improvement over all the methods, known so far.

BRIEF SUMMARY OF THE INVENTION

Quasi-stationary state in welding operation results in causing second order quasi stationary states to come into effect. In particular, the SQS state at the TEW is the most important as defects and residual stresses are built therein in the microstructure during the process of solidification and remain in weld for its life, unless steps are taken to modify structures in microstructures. Weld defects such as porosity once formed can never be eliminated.

It is known that (micro-) strcuctures are developed in atoms, molecules and their groups at sub-microscopic, microscopic and macroscopic level respectively during the process of solidification. Rapid heat conduction is one of the causes for overall stress in structural bonds to be in excess than required. Such retained stress in solidified microstructure is the residual stress.

In brief what I found is modification of structures in microstructure is possible and can reduce retained residual stress. In the Trailing Edge Stress Relief (TESR) process, it is reduced by input of external energy by application of the cyclic stresses to TEW in SQS state of a weld.

It is the principal object of my invention to develop a process which can be used with a fusion welding process like Gas Metal Arc Welding (GMAW), or Sub-merged Arc Welding (SAW), to produce a weld with reduced residual stresses.

Another object of my invention is to develop a process that produces welds with reduced discontinuities such as porosity.

Another object of my invention is to develop a process that can be applied during welding at the TEW in SQS state.

A still further object of my invention is to provide a process which is controllable externally.

A still further object of my invention is to provide a process so that parameters of frequency and stress amplitude appropriate for reduction of residual stress and weld defects for a specific alloy composition and and specific weld size, can be determined.

Another object of my invention is to make the stress relieving process user friendly, making the process part of the welding power set operation;

Further object of my invention is to provide a process that can be used conveniently for welding structures such as high rise steel structures or ships or submarines or welding under water or extended applications in inclement climate or in space, for which furnace treatment facilities can not be created.

Another object of my invention is to provide a process which will reduce non destructive testing and industrial handling and time delays due also to subsequent stress relieving operations where possible, such as post weld thermal treatments, along with costs associated with it. Further object of the invention is to reduce the handling of detached equipment such as vibrators or furnaces to stress relieve the weldment.

I found that these and other objects may be attained by a process in which stress cycles are applied to solidified weld metal surface following the SMZ, as the said SMZ being.

More particularly these objects may be achieved by application of appropriate stress amplitude/s and frequency/cies to the TEW as the welding gun moves at the welding speed, on the center line of weld. Further, when sufficient data on parameters of the TESR process is collected on several weldable alloys, the data base will be useful for designing residual stress level in a weld.

Further objects and features of my invention will be apparent from the following specifications and claims when considered in connection with drawings illustrating several embodiments of my invention.

BRIEF DESCRIPTION OF THE DRAWINGS

The invention will be more fully understood by reference to the following drawings which are for illustrative purpose only.

In describing the p referred embodiment of the invention illustrated in drawings, specific terminology will be used for the sake of clarity. However, it is not intended to be limited to the specific terms so selected and it is to be understood that each specific term includes all technical equivalents which operate in a similar manner to accomplish a similar purpose.

DETAILED DESCRIPTION OF THE INVENTION

Figure 1:
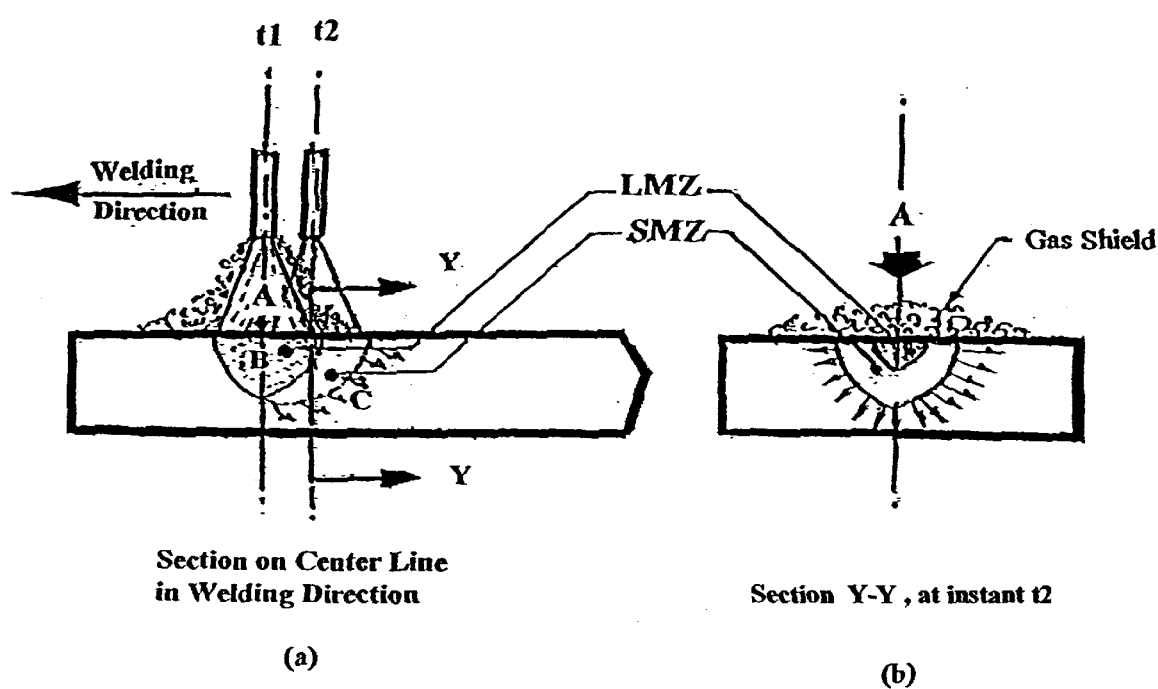
FIG. 1 is a layout of weld at two succeeding instants, during welding by a welding process such as GMAW or SAW.

FIG. 1, shows welding operation at two succeeding instants.

In FIG. 1(a), "t1" and "t2" are two instants when torch and are column A, move at the welding speed in the direction of welding shown by arrow, along the centerline of the joint of weld plates placed in juxta-position for welding. LMZ B, the Liquid Metal Zone is a cup of liquid metal, created by the column of the arc A at instant "t1". As the arc moves ahead, at instant "t2" solidification of the cup of molten metal begins; This zone is designated as SMZ, the solidifying Metal Zone. This zone extends until the molten metal is solidified. SMZ is at the TEW, the Trailing Edge of the Weld, obviously; and the process is incremental and continuous until the length of the weld is accomplished.

Section Y—Y in FIG. 1(b) shows condition at instant "t2". The SMZ is covered by trailing gas shield, in case of a GMAW weld, or the deposited flux in case of SAW process. SMZ is characterized with start of solidification as LMZ ends. This progressive solidification takes place as the heat is conducted away from the molten solidifying metal. In general arrows C attached to solidification interface show direction of conduction of heat, relative to weld progression.

Figure 2A:
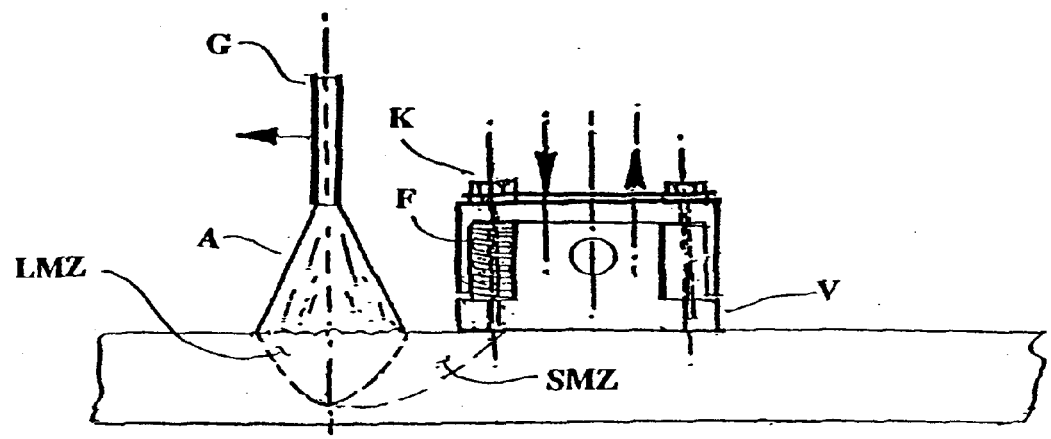
FIG. 2 is an arrangement of input device for input of external energy into TEW by applying stress cycles to the TEW.
Figure 2B:
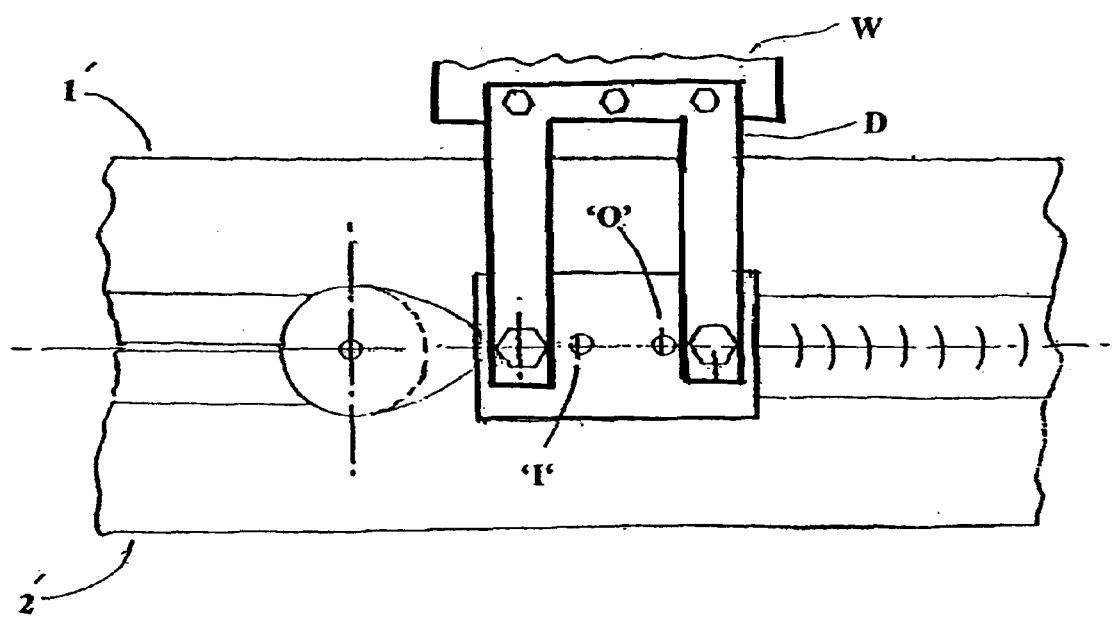

FIG. 2(a) is a side view, shows schematic layout of the Vibrator assembly 'V' which inputs energy into TEW, in the form of cyclic stresses and follows the arc column 'A' along the center line of two plates 1' and 2', with bevel cut, placed in juxta position for welding, as shown in plan view FIG. 2(b). Arrow attached to welding gun 'G' in FIG. 2(a) shows the direction of welding. Vibrator 'V' delivers impacts to surface of solid metal resulting from SMZ at TEW due to unbalanced mass in its rotor, depending upon air pressure inlet to port 'I', 'O' in FIG. 2(b) is air outlet; Inlet and oulet ports are shown by arrows in FIG. 2(a), also. Frequency of impacts and amplitude of stress can be varied, by changing inlet air pressure at air manifold. In FIG. (2a) two Springs 'F' and bracket 'D' are held by two bolts 'K'. 'K' fastens bracket 'D' and the housing to vibrator base. The assembly of the vibrator is fastened by a bracket 'D' to section 'W' of speed controlled welding carriage which carries the welding gun 'G' also.

Figure 3A:
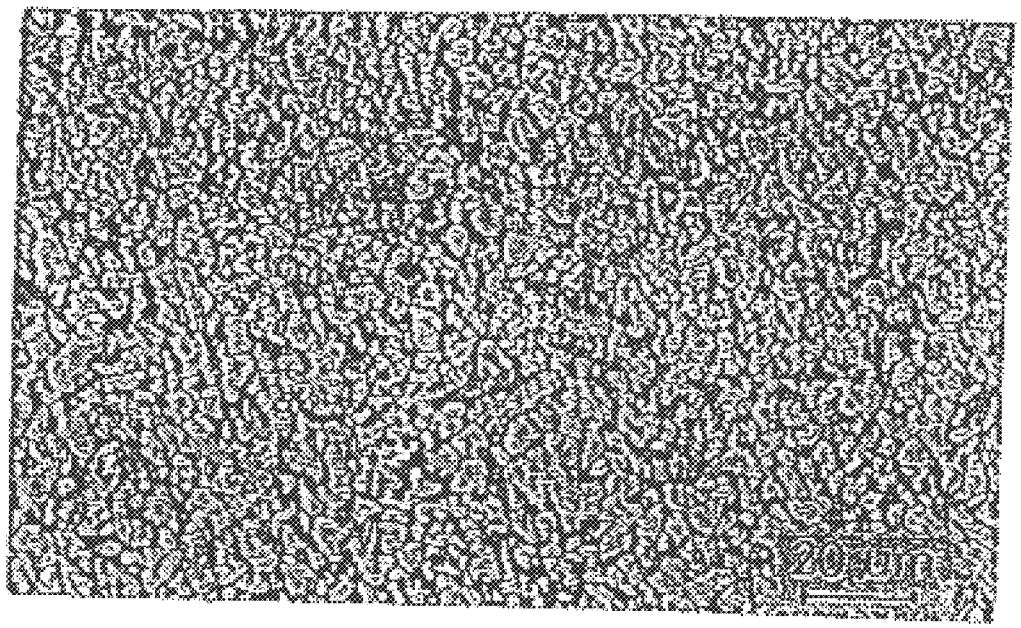
FIG. 3 is an example of the observed effect on microstructure.
Figure 3B:
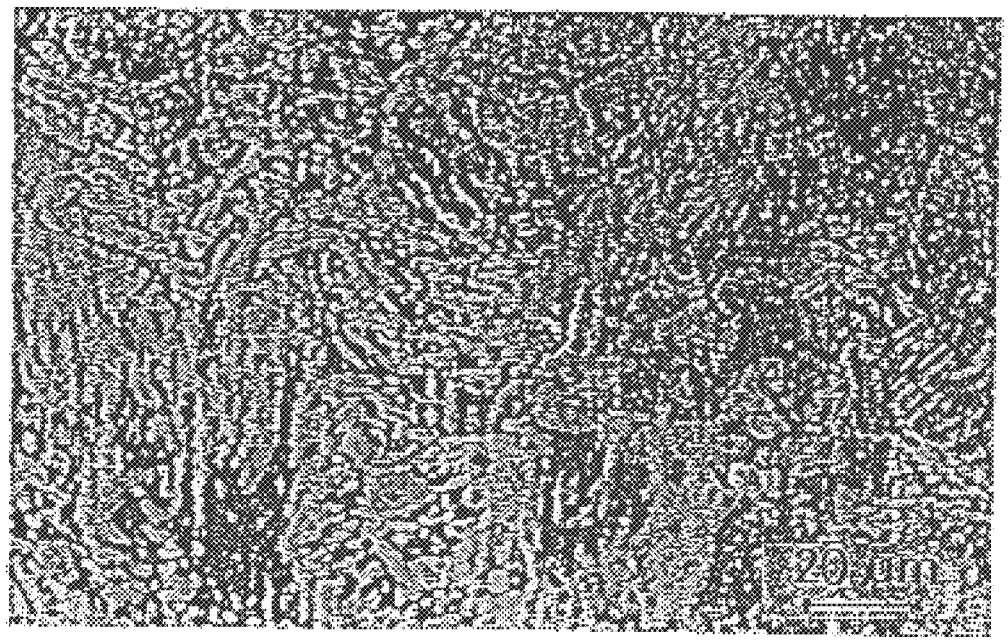

FIGS. 3(a) and 3(b) shows effect on microstructure of application cyclic of stresses to TEW of a weld. Welding was carried out on ⅜ inch thick, 10 inch×5 inch size mild steel plate, placed in juxtaposition for welding. Plates were machined to create 60 degree bevel for input of weld metal. In this example following parameters were used.

| Material: | Thickness of plates: | Welding Voltage, | Current | Welding Speed |
|---|---|---|---|---|
| mild steel: ASTM 1025 | 0.375 inch | 22 Volts | 148 Amps | 10 IPM |
| Applied frequency of stress: 400 Hz | | | Location of application: 2 inches behind the Arc column center line; | |

The vibrator unit delivered the impacts of about 90 lb. at 400 Hz, with amplitude of 5 thousands of an inch, when inlet air pressure was of 54 lb.

FIG. 3(a) shows grain size was reduced to 11.5 $\mu$m from grain size of 38 gm seen in FIG. 3(b) of weld in which this process is not applied.

Figure 4A:
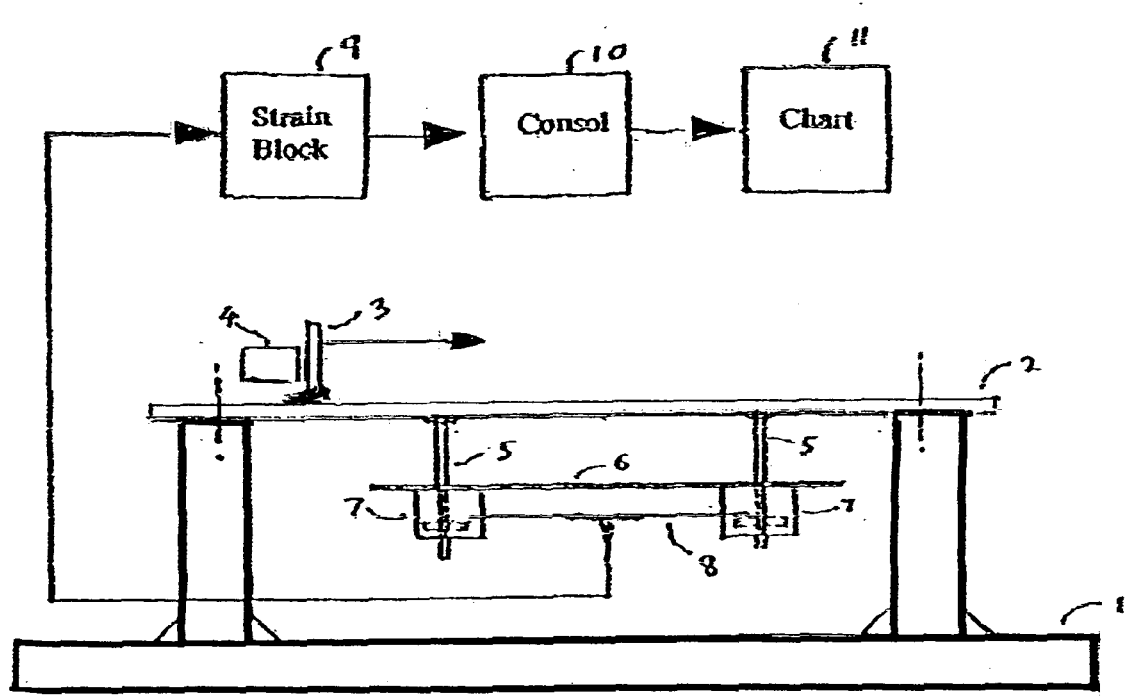
FIG. 4 is an example of the observed effect on residual stress.

FIG. 4(a) shows Strain Gage Bridge (SGB) 8, in which a strain gage is pasted on a thin steel strip. The SGB is mounted on stud-welded studs, 5. In the schematic FIG. 4(a), 1 is the welding fixture which carries two plates 2, supported on columns welded to base of the fixture. Welding is carried out by MIG gun 3, in the direction of arrow attached to it. 4 is the vibrator unit that imparts impacts to TEW at a frequency with specific amplitude. In the system used 9 is the dummy strain block and change in strain in strain gage is measured by Whetstone Bridge network console 10. 11 is a chart recorder.

Figure 4B:
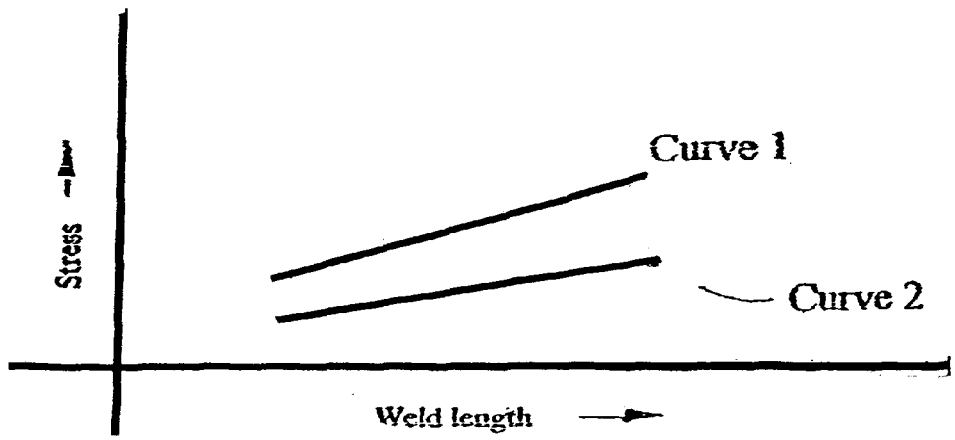

In FIG. 4(b), Curve 1 shows the residual stress developed during welding, corresponding to FIG. 3(a). Curve 2 shows the residual stress when TESR process is used. Curves 1 and 2 show stresses developed between studs 5 in the weld. Comparison of these curves indicates reduction of residual stress.

Operation

The known fact that as temperature of SMZ falls, strength of micro-constituents increases is relevant to the process disclosed. As structures in microstructure solidify, the potential energy at every instant of growth is modified to higher level. Cyclic stresses applied to SMZ may be bringing forth some known mechanisms such as dislodging and diversification of components of crystals and grains that are still in forming stage and may also be increasing mobility of atoms and atom groups in LMZ. In effect the process produces solidified structure with reduced grain size as seen in FIG. 3(*a*). Further, the residual stress, which is cause for distortion, is reduced as seen in FIG. 4(*b*).

It is to be understood that while detailed drawings and example cited describe the preferred embodiment of my invention, they are for illustration only. The process invented is not limited to specific details and conditions disclosed; process can be applied to multi pass welds, as well as welds produced by multiple welding wires in fusion welding, and various changes can be made within the ambit and scope of my invention. Obviously, the TESR process can be integrated with a welding operation. Thus the scope of this invention should be determined by the appended claims and there equivalents. My invention is defined by the following claims:

I claim:

1. A process comprising steps of
   (a) providing a device for input of external energy by application of stress cycles during a welding process, the said welding process generating a LMZ;
   (b) the said LMZ resulting into SMZ; the said device following the said SMZ at every instant of the said weld,
   (c) the said device applying the said stress cycles to a solid surface resulting from the SMZ of the said LMZ;
   (d) the said input of external energy modifying structures in microstructure of the said SMZ at TEW of the said weld.

2. A process according to claim 1, in which the said device develops stress cycles with controllable stress amplitudes and frequencies.

3. A process as described in claim 1, in which applied stress cycles modify a microstructure of the weld, the said modification reducing a level of residual stress and discontinuities in the said weld.

4. A process as claimed in claim 1 in which the balance of external input energy transmits to LMZ from the said SMZ.

* * * * *